Oct. 4, 1932. M. A. WECKERLY 1,880,563
WEIGHING SCALE
Filed April 3, 1930 3 Sheets-Sheet 3
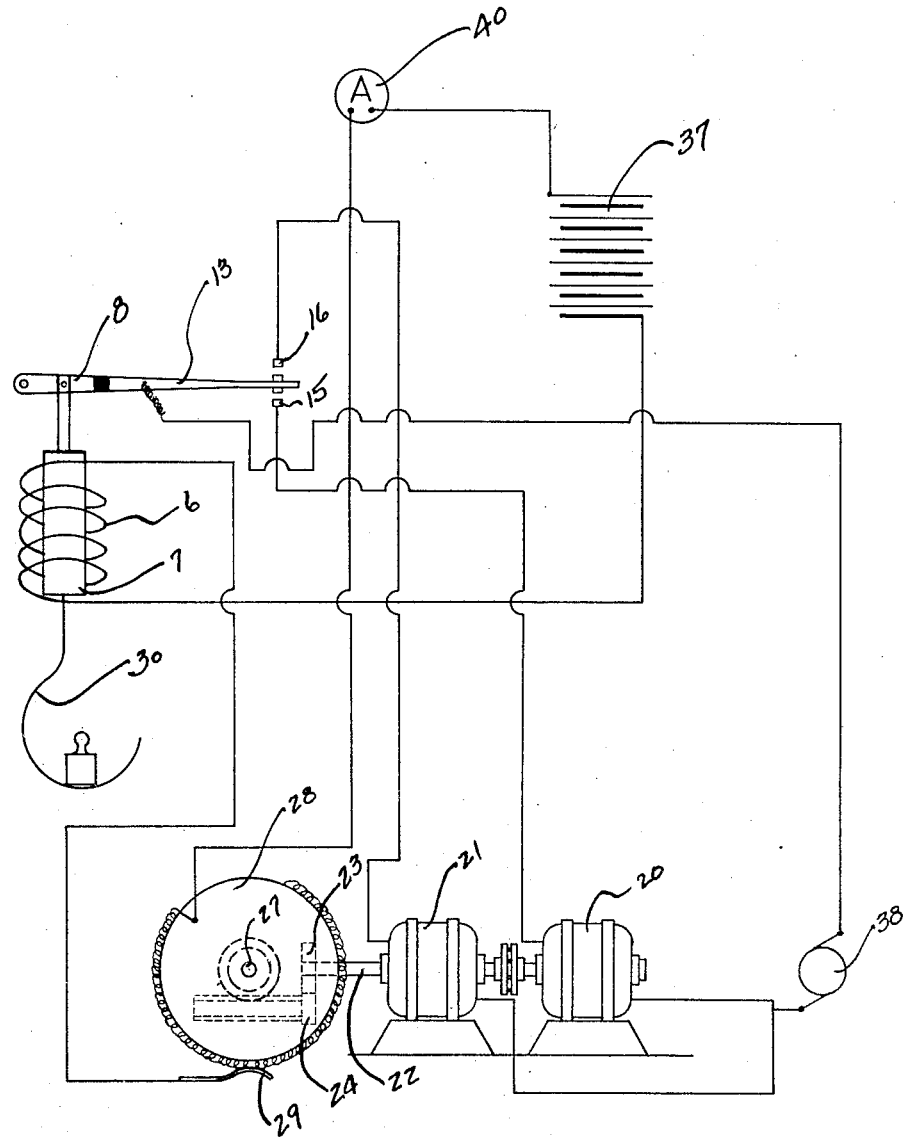

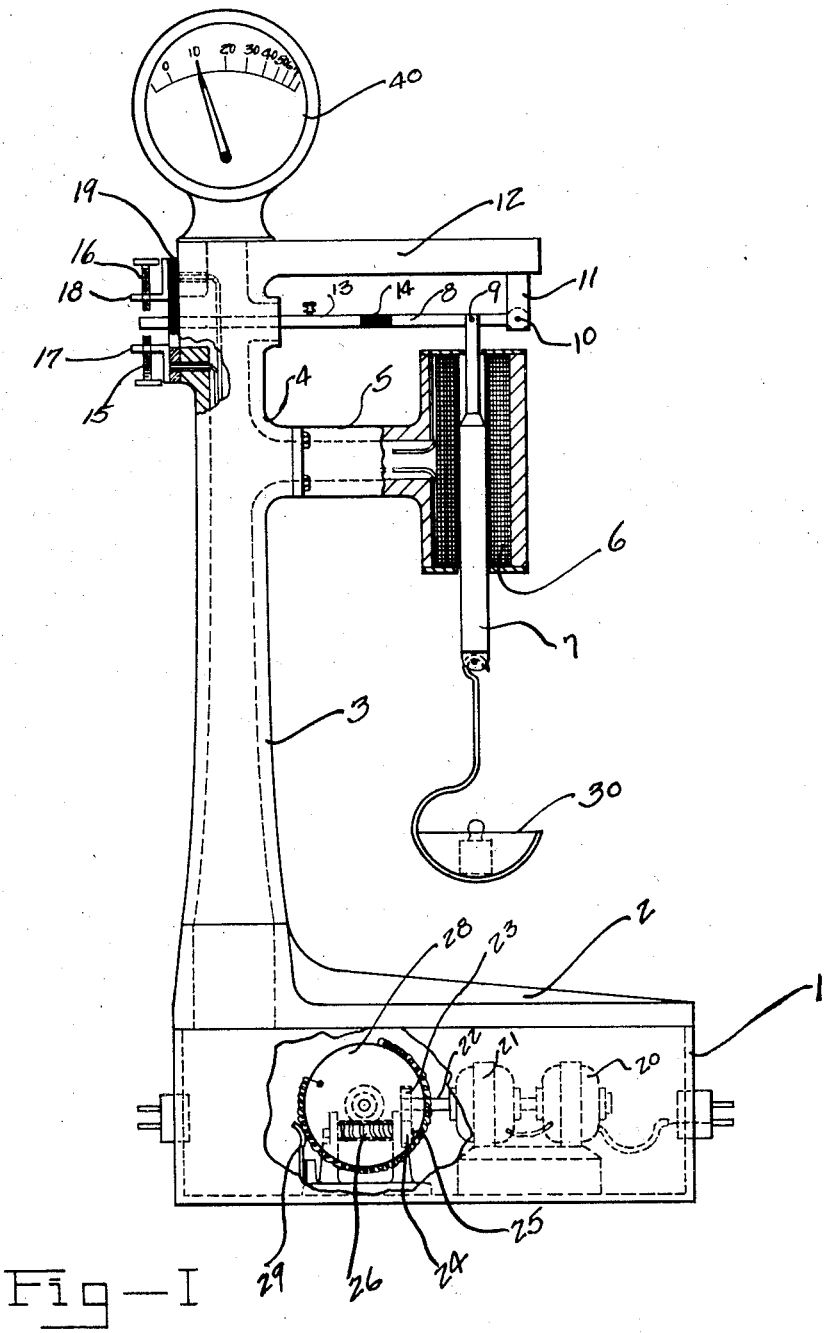

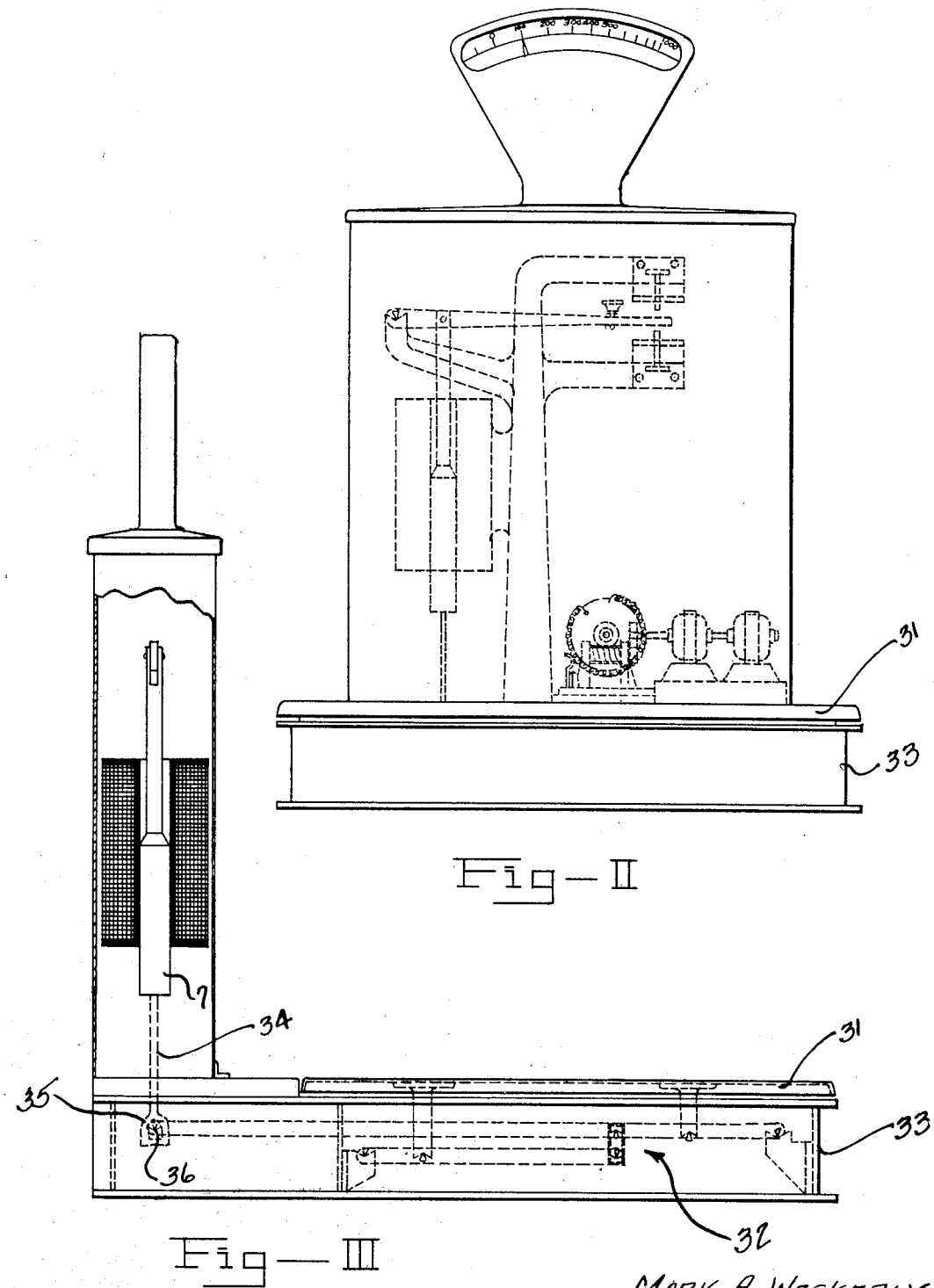

Patented Oct. 4, 1932

1,880,563

UNITED STATES PATENT OFFICE

MARK A. WECKERLY, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed April 3, 1930. Serial No. 441,384.

This invention relates to devices for measuring and indicating the weight of commodities, by electrical means. Heretofore attempts have been made to obtain the same results by various electrical means, which proved unsuccessful, however, owing to the fact that they required an electrical current having a constant potential, which is practically impossible to obtain.

The embodiment of the present invention does not require such a current source, any current as supplied by the different power companies may be employed.

The principal object of my invention consists in the provision of improved means whereby the weight of articles or commodities can be measured electrically.

Another object is the provision of an improved organization in which weight transmitting and counterbalancing means is freed of the influence of electrical contacts and other influences liable to interfere with its freedom of movement when in balance.

Another object of the invention consists in the provision of improved means employed whereby, for the preceding object, a current having a fluctuating potential may be used.

Another object of the invention is the provision of improved means for indicating the weight.

Another object is the provision of an organization in which electromagnetic force to counterbalance a load is created by a current, automatic means is provided for varying the current supply and the amount of current is constantly indicated.

Another object is the provision of an organization in which the indicating device acts without tendency to change the condition of balance between the electromagnetic load-counterbalancing means and the load.

Still another object is the provision of a number of indicating stations which simultaneously and invariably give the correct weight.

A still further object is the provision of means whereby the embodiment of the present invention may be manufactured economically under modern producton methods.

These and other objects will be apparent from the following description in which reference is had to the accompanying drawings illustrating preferred embodiments of the invention and wherein similar reference numerals designate similar parts throughout the several views.

In the drawings:—

Figure I is a front elevational view with parts in section and parts broken away, of one form of my invention.

Figure II is a front elevational view of a form of my device, adapted to weigh and indicate heavy loads.

Figure III is a side elevational view thereof, having a part broken away and parts in section.

Figure IV is a diagram showing the electrical system.

Referring to the drawings in detail, the device as illustrated in Figure I consists of a substantially box-like base 1 having a cover member 2 on which is mounted an upwardly extending column-like frame 3. To a projecting boss 4 on the frame 3, a bracket 5 which is preferably made of non-magnetic material, is fastened, which forms a support for a solenoid coil 6. A floating armature 7, adapted to be acted upon by the magnetic force generated by the coil 6, is pivotally connected to a lever 8 at 9. The lever 8 is fulcrumed at 10 to a depending bracket 11 secured to a laterally extending arm 12 of the frame 3. A portion 13 of the lever 8 is insulated from the main portion by a di-electric member 14. Said insulated portion 13 is designed to make and break contact with the contact screws 15 and 16 which are threaded through apertures in the brackets 17 and 18 which are fastened to, although insulated by the member 19 from the frame 3. The base 1, in this embodiment, of my invention serves as a receptacle for a pair of motors 20 and 21. They are mounted on a single shaft 22 and adapted to rotate in opposite directions. The shaft 22 is extended and is provided with a pinion 23 which meshes with a gear 24 mounted on a short shaft 25. This shaft 25 is also provided with a worm thread 26 which cooperates with a worm gear 27 fastened to a revolvable rheostat 28. The resistance consists of a coil of resistance wire, secured to the periphery of the revolvable body. A wiper 29 is mounted so as to contact the resistance coil.

Referring to Figures I and IV, the operation of the device is as follows: A certain amount of rectified current, from the source 37 is constantly flowing through the solenoid coil 6 generating sufficient magnetic force to retain the load receiver in its initial unloaded position. When a load is placed on the commodity receiver 30, this magnetic force is not sufficient to balance the load, the armature 7 drops pulling the lever 8, to which it is pivotally connected, with it. The insulated portion 13 of the lever 8, when coming in contact with the contact point 15 closes the circuit in which the motor 20 is in series with a current source 37. This motor will now revolve, and by means of the reduction gearing, comprising the parts 23, 24, 25 and 26, revolve the rheostat 28, in the direction so that the distance between the intake point and the wiper 29 is diminished, thus reducing the resistance, and increasing the flow of current in the solenoid until the pull of the solenoid on the armature balances the weight of the load. When the pull on the armature balances the weight of the load, the armature is raised so that the contact, of the portion 13 of the lever 8 with the contact point 15 is broken. The motor 20 thereupon stops revolving, until another contact is made.

Figure II illustrates a device as described, modified, so that the weight of heavy loads may be determined. In this modification the several counterbalancing parts comprising the device are identical with the counterbalancing parts in the device hereinbefore described and they have, therefore, been given the same designating numerals. The modification consists in that the load, instead of being placed directly in the pan 30 which is suspended from the armature 7, is placed on a platform 31 suitably mounted on a lever system 32 which is supported and housed within the base 33. The force exerted by a load, placed on the platform is transmitted by the lever system 32 and a connecting rod 34 which is fastened to the armature 7 and which is provided with a stirrup 35 for the reception of the lever nose pivot 36.

As the value of the current passing through a solenoid coil is a measure of the pull exerted by the solenoid coil on the armature, an ammeter 40 is provided to indicate this pull. The chart of the ammeter is calibrated to indicate pounds and fractions thereof.

When the load is diminished the current flowing through the solenoid generates a greater magnetic force than is necessary to counterbalance this diminished load and the armature is forced upwardly until the lever 8, by means of the insulated portion 13, closes the feed circuit of the motor 21. The motor 21 is mounted to revolve in the opposite direction to the motor 20 and through the reduction gearing turns the rheostat, until the resistance is increased so that the amount of current flowing through the solenoid coil generates just sufficient magnetic force to balance the pull of the load on the armature. At this time the contact of the lever portion 13 with the contact screw 16, is broken and the rotation of the motor 21 is stopped. Then again only sufficient current to hold the load receiver in its initial position, will flow through the solenoid.

While the embodiments of my invention herein shown and described are well adapted to fulfill the objects stated, it is to be understood, however, that the invention is susceptible to further modification and change within the meaning and scope of the subjoined claims.

Having described my invention, I claim:

1. In a device of the type described, in combination, a load receiver, electro-magnetic means for offsetting loads operatively connected to said load receiver, a current supply means for said electro-magnetic means and means for varying the amount of current supplied, said means for varying said amount of current comprising a rheostat, and automatic means for operating said rheostat, said automatic means comprising a pair of electro-motors and a plurality of contacts adapted to selectively close the operating circuits of said motors.

2. In a device of the type described, in combination, a load receiver, electro-magnetic means for offsetting loads operatively connected to said load receiver, a current supply means for said electro-magnetic means and means for varying the amount of current supplied, said means for varying said amount of current comprising a rheostat, and automatic means for operating said rheostat, said automatic means comprising a pair of electro-motors and a plurality of contacts adapted to selectively close the operating circuits of said motors, and a separate current supply for said electro-motors.

3. In a device of the type described, in combination, a load receiver, electro-magnetic means for offsetting loads operatively connected to said load receiver, a direct current supply means for said electro-magnetic means, means for varying the amount of current supplied, said means for varying said amount of current comprising a rheostat and automatic means for operating said rheostat, said automatic means comprising a pair of electro-motors, a plurality of contacts controlled by a load on the load receiver and a separate alternating current supply for said electro-motors.

4. In a device of the type described, in combination, load receiving means and electro-magnetic offsetting means connected thereto, a lever which is adapted to control the amount of current energizing said electro-magnetic means, means pivotally connecting said lever and said electromagnetic load-offsetting means, said lever and the parts connected thereto being freely movable when the load and electromagnetic load-offsetting means are in balance.

5. In a device of the class described, in combination, load-receiving means and electromagnetic offsetting means connected thereto, a lever which is adapted to control the amount of current energizing said electromagnetic means, means pivotally connecting said lever and said electromagnetic load-offsetting means, motor operating circuits, said lever co-operating with a plurality of contacts in said motor operating circuits adapted to start and stop a motor, said lever and the parts connected thereto being freely movable when the load and electromagnetic load-offsetting means are in balance.

6. In a device of the class described, in combination, load-receiving means and electromagnetic offsetting means connected thereto, a lever which is adapted to control the amount of current energizing said electromagnetic means, means pivotally connecting said lever and said electromagnetic load-offsetting means, motor operating circuits, said lever co-operating with a plurality of contacts in said motor operating circuits adapted to start and stop a plurality of motors, said lever and the parts connected thereto being freely movable when the load and electromagnetic load-offsetting means are in balance.

7. In a device of the class described, in combination, load-receiving means and electromagnetic offsetting means connected thereto, a lever which is adapted to control the amount of current energizing said electromagnetic means, means pivotally connecting said lever and said electromagnetic load-offsetting means, motor operating circuits, said lever cooperating with a plurality of contacts in said motor operating circuits adapted to start and stop a plurality of motors, said motors rotating in opposite direction, said lever and the parts connected thereto being freely movable when the load and electromagnetic load-offsetting means are in balance.

8. In a device of the class described, in combination, load receiving means and electro-magnetic offsetting means connected thereto, a lever, said offsetting means being pivoted to said lever which is adapted to control the amount of current energizing said electro-magnetic means, means pivotally connecting said lever and said electromagnetic load-offsetting means, motor operating circuits; said lever co-operating with a plurality of contacts in said motor operating circuits adapted to start and stop a plurality of motors, said motors rotating in opposite directions and mounted on a common shaft.

9. In a device of the class described, in combination, a load moment reducing lever system, a load receiver mounted thereon, electro-magnetic means for offsetting loads operatively connected to said load receiver, a current supply means for said electro-magnetic means and means for varying the amount of the current supplied, said current varying means functioning automatically in response to conditions of unbalance and indicating means for constantly indicating the amount of current supplied to said electromagnetic means.

10. In a device of the class described, in combination, a load moment reducing lever system, a load receiver mounted thereon, electromagnetic means for offsetting loads operatively connected to said load receiver, a current supply means for said electro-magetic means and means for varying the amount of the current supplied comprising a variable resistance, said current varying means functioning automatically in response to conditions of unbalance and indicating means for constantly indicating the amount of current supplied to said electromagnetic means.

11. In a device of the class described, in combination, a load moment reducing lever system, a load receiver mounted thereon, electro-magnetic means for offsetting loads operatively connected to said load receiver, a current supply means for said electro-magnetic means, means for varying the amount of current supplied comprising a variable resistance and automatic means controlled by the weight of the load to vary the resistance and indicating means for constantly indicating the amount of current supplied to said electromagnetic means.

12. In a device of the class described, in combination, a load moment reducing lever system, a load receiver mounted thereon, electro-magnetic means for offsetting loads operatively connected to said load receiver, a direct current supply means for said electro-magnetic means, means controlled by the weight of a load on the load receiver for varying the amount of current supplied including a source of alternating current for an electro-motor.

13. In a device of the class described, in combination, a load moment reducing lever system, a load receiver mounted thereon, electro-magnetic means for offsetting loads operatively connected to said load receiver, a direct current supply means for said electro-magnetic means, means controlled by the weight of a load on the load receiver for varying the amount of current supplied including a plurality of electro-motors mounted on a common shaft, one of said motors being adapted to rotate in a clockwise direction and other of said motors being adapted to operate in a clockwise leverage.

MARK A. WECKERLY.